United States Patent [19]
Yasumoto et al.

[11] 3,944,975
[45] Mar. 16, 1976

[54] SIGNAL CHECKING SYSTEM

[75] Inventors: Seiichi Yasumoto; Kazuhiko Kobayashi; Isao Yasuda, all of Hitachi; Ken Itoh, Kokubunji, all of Japan

[73] Assignees: Hitachi, Ltd.; Japanese National Railways, both of Japan

[22] Filed: May 27, 1975

[21] Appl. No.: 580,825

[30] Foreign Application Priority Data
May 27, 1974 Japan.................. 49-58807

[52] U.S. Cl..................... 340/146.1 AB; 340/146.2
[51] Int. Cl.² ................ H04L 17/02; H03K 13/34; G06F 11/12; G05B 1/03
[58] Field of Search............................ 340/146.1 AB

[56] References Cited
UNITED STATES PATENTS
3,781,796  12/1973  Smith ...................... 340/146.1 AB Primary Examiner—R. Stephen Dildine, Jr.
Attorney, Agent, or Firm—Craig & Antonelli

[57] ABSTRACT

A signal checking system for use in a hardware system having a converter for converting coded input signals consisting of a plurality of bits into corresponding individual signals, wherein undesirable selection of an erroneous output and multiple outputs by the converter is detected by means adapted for checking the relation between the input to the converter and the output of a first coder connected to the converter and checking the complementary relation between the output of the first coder and the output of a second coder connected to the converter.

6 Claims, 3 Drawing Figures

SIGNAL CHECKING SYSTEM

BACKGROUND OF THE INVENTION

1. Field of the Invention

This invention relates to a signal checking system for accurately and reliably detecting appearance of an erroneous output or multiple outputs due to erroneous selection or multiple selection by a converter which is adapted for converting a coded input signal consisting of a plurality of bits into one of a plurality of individual single output signals.

2. Description of the Prior Art

In a hardware system including a converter adapted for converting a coded input signal consisting of a plurality of bits into one of a plurality of individual single output signals, a plurality of terminal equipments (controlled systems) are frequently directly controlled by the individual single output signals appearing from the converter as a result of the conversion. Therefore, when the element or elements of the converter fail to properly operate, an output signal different from a specific output signal will appear from the converter due to erroneous selection or a plurality of output signals will appear from the converter due to multiple selection in response to the application of an input signal instructing one of the terminal equipments to be selected. Execution of control while ignoring this unusual selection will result in erroneous control of the specific terminal equipment, and undesirable system-down will be given rise to.

A so-called loop checking method, for example, has been generally employed to detect appearance of an undesirable output or outputs due to erroneous selection or multiple selection by a converter which is adapted for converting a coded input signal consisting of a plurality of bits into one of a plurality of individual single output signals. In such a prior art method, a signal sent back from a controlled station is compared in a control station with a signal sent out already and stored in a memory in the control station which has the function of detecting the presence of any error between these signals. Thus, this prior art method has been defective in that an unusual situation occurring in a converter in the control station cannot be quickly dealt with and remedied. Further, the entire loop checking system is included in the trouble detection range of the control station according to the prior art method. Thus, when, for example, the controlled station is quite remote from the control station or a switching system is present therebetween, all these circuits or the signal transmission paths and signal transmitting and receiving circuits on the receiving side are included in the trouble detection range of the control station. Therefore, the prior art loop checking method adapted for error detection on the basis of the loop checking in the control station has also been defective in that the trouble detection range is very wide resulting in difficulty of quick detection of a faulty element or part.

SUMMARY OF THE INVENTION

It is an object of the present invention to provide a novel and improved signal checking system which can reliably detect errors in individual single output signals of a converter in a controlled station controlled by a control system thereby improving the reliability and safety of the control system.

Another object of the present invention is to provide a signal checking system which is simple in circuitry and yet can easily and reliably detect a faulty element or part.

In accordance with the present invention, there is provided a signal checking system comprising a returning signal coder to which a plurality of individual single signals are applied in a first order to be converted into corresponding scale-of-N coded output signals ($N \geq 2$), a checking coder to which said same individual single signals are applied in a second or reverse order to be converted into corresponding scale-of-N coded output signals, and a complement checking circuit for checking the complementary relation between the output of said returning signal coder and the output of said checking coder.

DESCRIPTION OF THE PREFERRED EMBODIMENT

Figure 1:
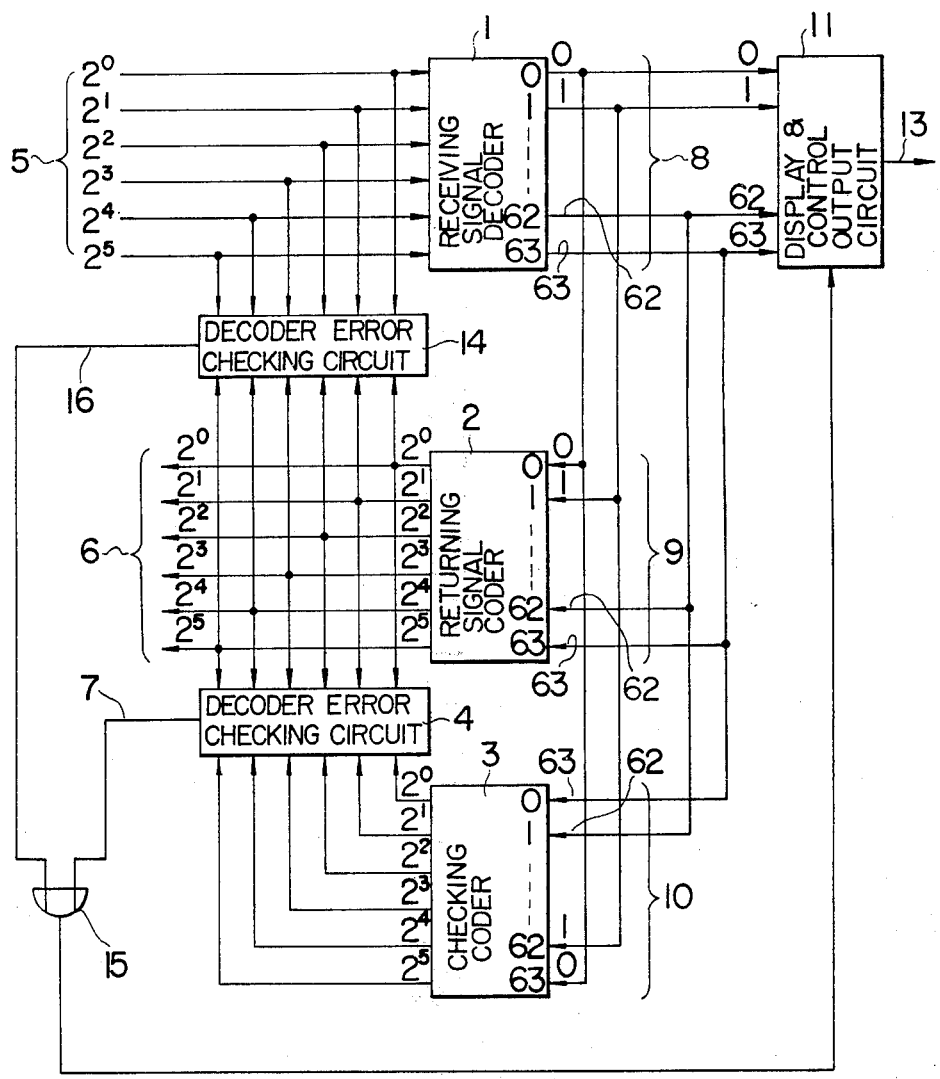
FIG. 1 is a block diagram of an embodiment of the signal checking system according to the present invention.

Referring to FIG. 1, a signal checking system embodying the present invention includes a receiving signal decoder 1 which is in the form of a diode matrix, integrated circuit or the like. An input signal designated generally by the reference numeral 5 is applied from a control station, a computer or the like (not shown) to the decoder 1 to specify one of a plurality of terminal equipments (not shown). For example, the input signal 5 is a 6-bit scale-of-N coded signal ($N \geq 2$), and the decoder 1 decodes this input signal 5 into one of sixty-four individual single signals appearing at respective output terminals 0 to 63.

An output signal designated by the reference numeral 8 appears from one of the 64 output terminals of the decoder 1 to be applied to a display and control output circuit 11 so that an output 13 corresponding to the specific input can be applied to the specific terminal equipment (not shown) when the output conditions of a pair of decoder error checking circuits 4 and 14 are satisfied as described later.

The output signals appearing at the output terminals 0 to 63 of the receiving signal decoder 1 are applied as an input signal 9 to respective input terminals 0 to 63 of a returning signal coder 20 in the above order. The coder 2 converts this input signal 9 into a coded output signal 6 of 6 bits. This coded output signal 6 of the coder 2 is sent out to the control station or computer as a loop checking signal, and at the same time, applied as one of two inputs to the decoder error checking circuit 14 described later.

The output signals appearing at the output terminals 0 to 63 of the receiving signal decoder 1 are also applied as an input signal 10 to respective input terminals 63 to 0 of a checking coder 3, that is, in an order reverse to the order in which these output signals are applied to the returning signal coder 2. Thus, the output signal 8 appearing at the output terminal 0 of the receiving signal decoder 1 is applied to the input terminal 63 of the checking coder 3, and the coder 3 converts this input signal 10 applied from the receiving signal decoder 1 into a coded output signal of 6 bits.

Figure 2:
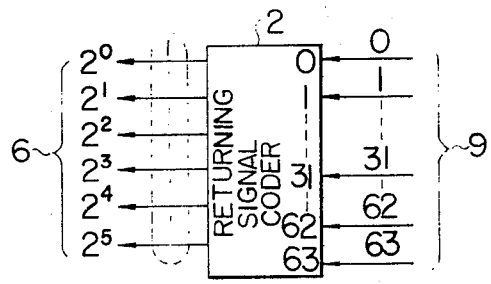
FIG. 2 is a block diagram showing a returning signal coder in FIG. 1.
Figure 3:
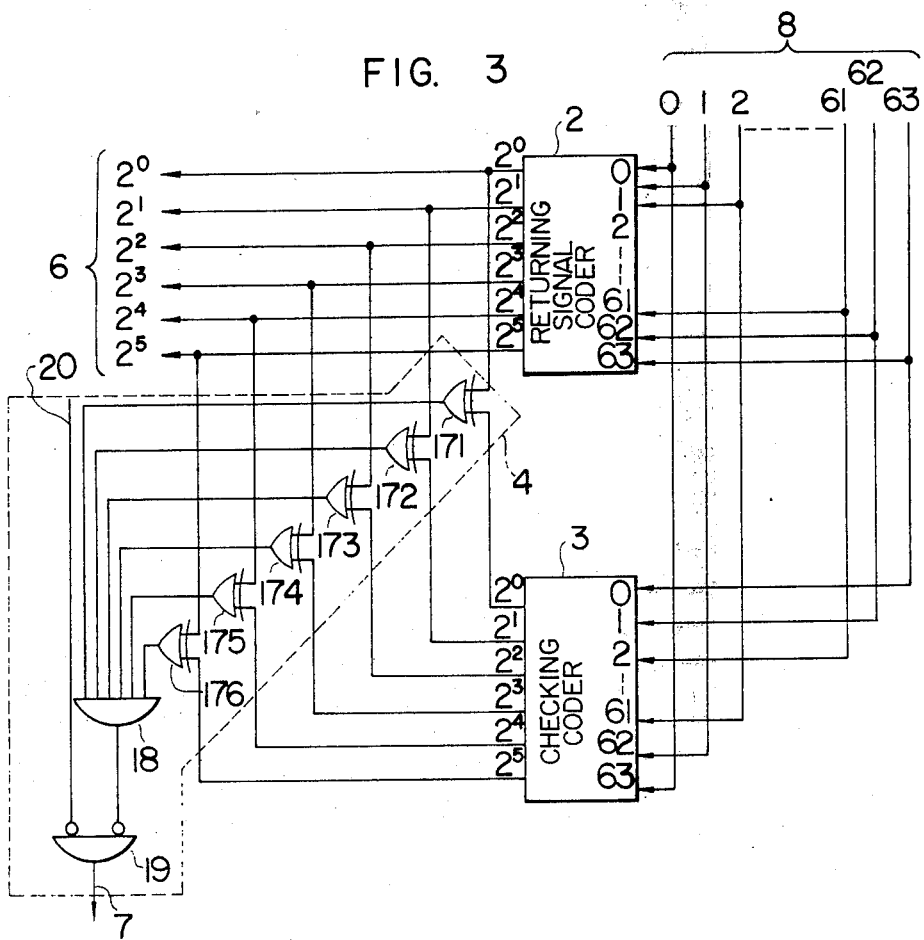
FIG. 3 is a block diagram showing a decoder error checking circuit in FIG. 1.

When a plurality of input signals are applied simultaneously to each of the coders 2 and 3, input signals corresponding to less significant digits may be masked by an input signal corresponding to a more significant signal and a coded output signal representative of the latter input signal may solely be delivered from the coders 2 and 3, or such input signals may be logically added together after being coded to provide an entirely different coded output signal. Suppose, for example, that trouble such as failure of the element or elements occurs in the receiving signal decoder 1 and a plurality of individual single input signals are applied from the decoder 1 to the coder 2 due to erroneous multiple selection as shown in FIG. 2. In such a case, a coded output signal corresponding to an input signal applied to the input terminal 63 would only appear from the coder 2 when two input signals are applied to the input terminals 61 and 63 simultaneously, and a coded output signal corresponding to an input signal applied to the input terminal 3 would appear from the coder 2 when two input signals are applied to the input terminals 1 and 2 simultaneously.

The decoder error checking circuit 4 is provided to detect the so-called multiple selection by the receiving signal decoder 1. This decoder error checking circuit 4 is composed of EXCLUSIVE-OR gates 171, 172, . . . . . 176 delivering an output only when the relation between the corresponding bits of the two coded output signals of the returning signal coder 2 and checking coder 3 is exclusive-or, an AND gate 18 connected to these EXCLUSIVE-OR gates 171 to 176, and another AND gate 19 connected to the AND gate 18. Thus, the decoder error checking circuit 4 checks as to whether the output of the coder 2 is complementary to the output of the coder 3.

The operation of the decoder error checking circuit 4 will be described in more detail. Suppose, for example, that a plurality of output signals appear at the output terminals 63 and 61 of the receiving signal decoder 1. In such a case, an output signal represented by 1, 1, 1, 1, 1, 1 appears at the output terminals $2^5$ to $2^0$ of the returning signal coder 2 as a result of logical addition of the coded output signals corresponding to the input signals applied to the input terminals 63 and 61 of the coder 2.

On the other hand, the output signals of the receiving signal decoder 1 are applied to the checking coder 3 in the order reverse to the order of application of the signals to the returning signal coder 2. Thus, the output signals appearing at the output terminals 63 and 61 of the decoder 1 are applied respectively to the input terminals 0 and 2 of the coder 3. Therefore, an output signal represented by 0, 0, 0, 0, 1, 0 appears at the output terminals $2^5$ to $2^0$ of the checking coder 3 as a result of logical addition of the coded output signals corresponding to the input signals applied to the input terminals 0 and 2 of the coder 3.

These coded output signals of 6 bits are applied from the coders 2 and 3 to the decoder error checking circuit 4 which checks for the complementary relation between the corresponding bits of these input signals. In the example presently discussed, there is no complementary relation between the bits at the $2^1$ bit position of these input signals. Thus, in this case, the AND condition for the AND gate 18 does not hold. The AND gate 19 has inverters at the input terminals thereof connected to the output terminal of the AND gate 18 and to a source of a timing signal 20 although this timing signal 20 is not shown in FIG. 1. Therefore, an output signal 7 indicative of erroneous operation of the decoder 1 appears from the AND gate 19 in response to the application of the timing signal 20 of O level from the timing signal source and a O from the AND gate 18 to the input terminals of the AND gate 19. The output signal 7 of the AND gate 19 is applied through an OR gate 15 shown in FIG. 1 to the display and control output circuit 11 shown in FIG. 1 to lock the output of the display and control output circuit 11. In this manner, the so-called multiple selection by the receiving signal decoder 1 can be reliably prevented.

In the form illustrated in the drawing, each of the returning signal coder 2 and the checking coder 3 is a conventional coder commonly employed in the art. However, each of these coders 2 and 3 may preferably be a priority encoder. When the priority encoders are used as these coders 2 and 3, a plurality of input signals applied simultaneously to a plurality of input terminals among the 64 input terminals of the coders 2 and 3 are coded in the preferential order of from the one applied to the input terminal nearest to the input terminal 63, and coded output signals corresponding to such input signals can be always delivered in that order from the coders 2 and 3. The use of the priority encoders is advantageous in that the faulty part can be more easily discovered after the detection of the trouble in the decoder due to the fact that the output signals of the coders 2 and 3 to which the input signals are applied in the normal order and reverse order respectively have individually an exact correspondence with the input signals.

The decoder error checking circuit 14 detects the so-called erroneous selection of a signal which is different from a specific signal. This decoder error checking circuit 14 compares the input signal 5 applied to the receiving signal decoder 1 with the output signal 6 of the returning signal coder 2 to check these signals for coincidence. When the signal 6 is out of coincidence with the signal 5, a non-coincidence signal 16 appears from the decoder error checking circuit 14 to be applied through the OR gate 15 to the display and control output circuit 11 so as to lock the output of the receiving signal decoder 1. Thus, appearance of an erroneous output signal different from a specific signal due to erroneous selection by the receiving signal decoder 1 can be reliably obviated by this decoder error checking circuit 14.

A so-called loop checking method is commonly known in the art as described previously. According to this loop checking method, the output signal of the returning signal coder 2 is returned to the control station to be compared in the control station with the corresponding signal sent out already and stored in the memory. In this loop checking method, the control station has the function of detecting any error between these signals, and the entire loop checking system is included in the trouble detection range of the control station. Thus, when, for example, the controlled station is quite remote from the control station or a switching system is present therebetween, all these circuits or the signal transmission paths and the receiving signal decoder and returning signal coder on the receiving side are included in the trouble detection range of the control station. Therefore, the trouble detection range of the control station is very wide resulting in difficulty of quick detection of a faulty element or part when the control station makes error detection on the basis of such a prior art manner of loop checking. In contradistinction, the signal checking system according to the present invention is advantageous in that the range of trouble detection is localized to facilitate trouble detection due to the fact that erroneous operation of the receiving signal decoder 1 and returning signal coder 2 can be locally detected by the decoder error checking circuit 14 on the receiving side.

It will be apparent from the illustrated embodiment of the present invention that the checking coder 3 and decoder error checking circuits 4 and 14 are merely required as additional means in the controlled station, and the signal checking system of such simple construction can be easily realized.

It will be understood from the foregoing detailed description of the present invention that erroneous selection and multiple selection objectionable for the proper control of terminal equipments can be reliably prevented. Therefore, possibility of erroneous control and erroneous display can be minimized in a control system for which a high degree of reliability and a high degree of safety are demanded.

We claim:

1. A signal checking system comprising a returning signal coder to which a plurality of individual single signals are applied in a first order to be converted into corresponding scale-of-N coded output signals ($N \geq 2$), a checking coder to which said same individual single signals are applied in a second or reverse order to be converted into corresponding scale-of-N coded output signals, and a complement checking circuit for checking the complementary relation between the output of said returning signal coder and the output of said checking coder.

2. A signal checking system as claimed in claim 1, wherein said returning signal coder and said checking coder are each in the form of a priority encoder.

3. A signal checking system as claimed in claim 1, wherein a decoder converts a scale-of-N coded input signal into a corresponding one of a plurality of individual single output signals and applies this output to said returning signal coder, and a comparing circuit is provided to compare the output of said returning signal coder with said scale-of-N coded input signal applied to said decoder.

4. A signal checking system as claimed in claim 3, wherein an output circuit is provided to apply said individual single signals to corresponding controlled equipments, and the output of said output circuit is locked by the output of said comparing circuit.

5. A signal checking system as claimed in claim 3, wherein an output circuit is provided to apply said individual single signals to corresponding controlled equipments, and the output of said output circuit is locked by both the output of said comparing circuit and the output of said complement checking circuit.

6. A signal checking system as claimed in claim 1, wherein an output circuit is provided to apply said individual single signals to corresponding controlled equipments, and the output of said output circuit is locked by the output of said complement checking circuit.

* * * * *